Figure 1:
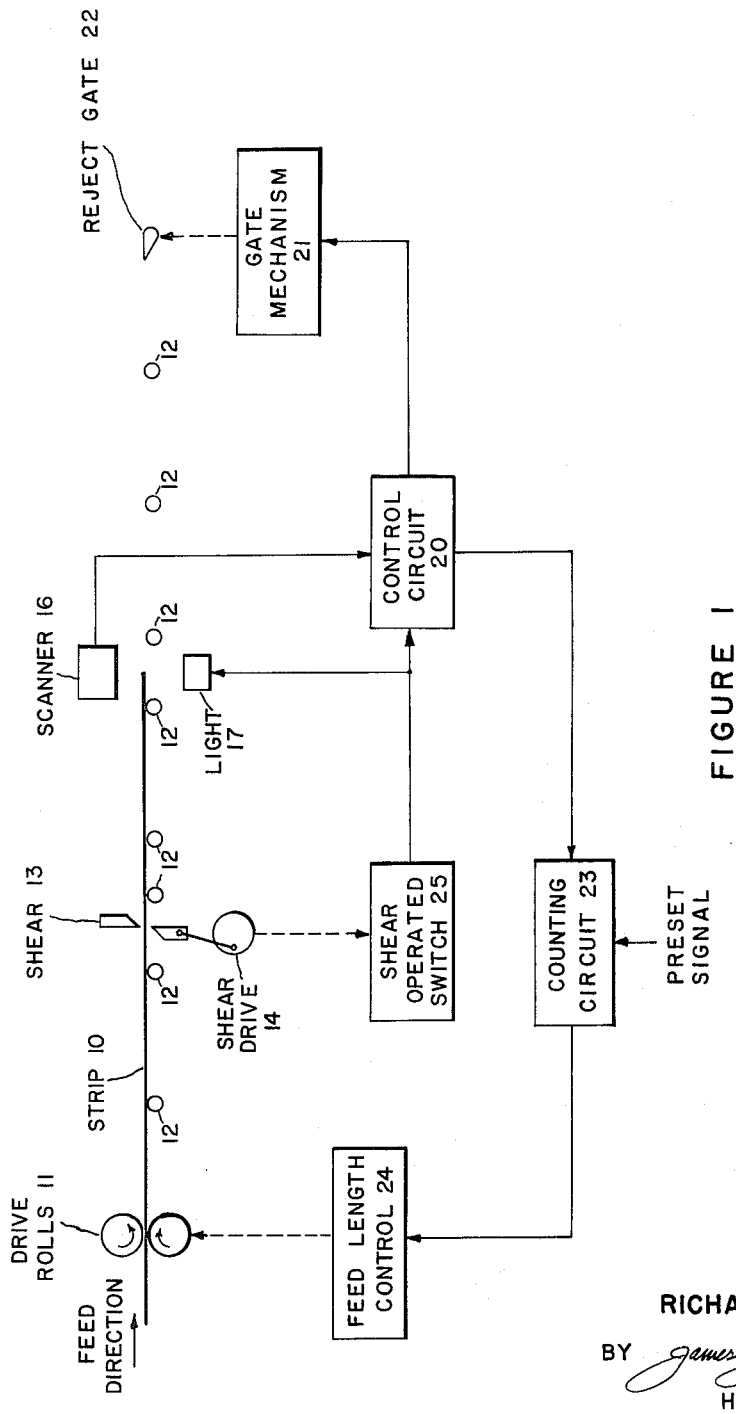

RICHARD F. MILLER
BY James G. Williams
HIS ATTORNEY

Dec. 28, 1965  R. F. MILLER  3,226,555
PHOTOSENSITIVE SYSTEM FOR INDICATING VARIATIONS
IN A DIMENSION OF AN ARTICLE
Filed April 6, 1962  3 Sheets-Sheet 2

RICHARD F. MILLER
BY James G. Williams
HIS ATTORNEY

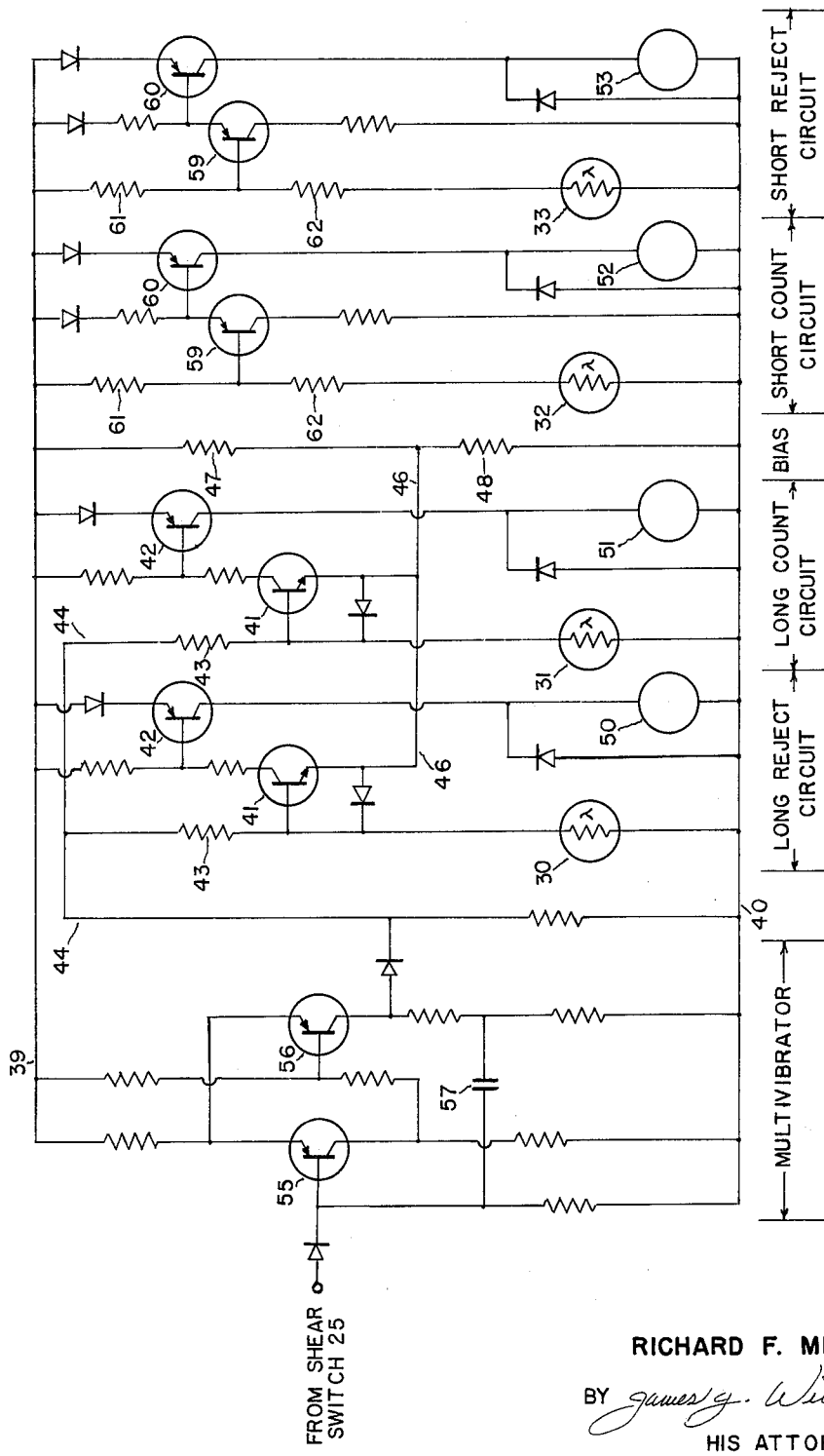

United States Patent Office 3,226,555
Patented Dec. 28, 1965

1

3,226,555

PHOTOSENSITIVE SYSTEM FOR INDICATING VARIATIONS IN A DIMENSION OF AN ARTICLE

Richard F. Miller, Naperville, Ill., assignor to General Electric Company, a corporation of New York Filed Apr. 6, 1962, Ser. No. 185,612
11 Claims. (Cl. 250—223)

The invention relates to an indicating circuit, and particularly to an indicating circuit for indicating the position of an edge or end of an article with respect to a reference point. More particularly, the invention relates to such an indicating circuit that provides one or more control signals for controlling or varying the distance of the article end from the reference point.

Some of the present techniques for manufacturing or processing steel or tinplate strip utilize rolls having hundreds of feet of such strip wound on them. The strip is unwound from the roll and threaded or fed through a processing line where it may be inspected for flaws or defects and cut into requisite or desired lengths. In certain processes, it is desirable, if not essential, that the strip length be accurately cut and measured. Such accuracy is important for various reasons, one of which is to reduce waste of the strip.

Accordingly, an object of the invention is to provide an improved indicating circuit for use in a strip processing line.

Another object of the invention is to provide an improved indicating circuit for indicating the position of an end of an article with respect to a reference point.

In a strip processing line such as just mentioned, one technique is to advance the leading edge or end of the strip through a cutter or shear by an amount equal to the desired cut length of the strip, and then to operate the shear. After the shear cut is made, the cut length of strip is advanced on, and additional strip from the roll is advanced through the shear. The cut length of the strip may be indicated or measured by the distance between the leading edge or end of the strip and the shear. Adjustment of this distance may be made to vary the cut length of the strip, this adjustment usually, but not necessarily, being made at or by means of the strip drive rolls. Ocassionally there may be a variation between the cut length of one strip and the cut length of a previous or subsequent strip without any adjustment having been made. While such an occasional variation may not be objectionable and therefore not warrant any correction, a number of such variations may be undesirable or intolerable.

Therefore, another object of the invention is to provide an indicating circuit which indicates the position, relative to a reference point, of the leading edge or end of cut lengths of strip, and which accumulates or maintains a running total of each such variation of position from a normal position.

Finally, the cut length of a strip may vary so widely from the desired length that the strip should be rejected.

Therefore, another object of the invention is to provide an indicating circuit which indicates the position, relative to a reference point, of the leading edge or end of cut lengths of strip, and which indicates any variation of position from a normal position that exceeds a predetermined value.

Another object of the invention is to provide an indicating circuit which indicates the position, relative to a reference point, of the leading edge or end of cut lengths of strip, which indicates any variation of position from a normal position that exceeds a predetermined value, and which further accumulates or maintains a

2 running total of each such variation of position from a normal position.

These and other objects are accomplished in accordance with one embodiment of the invention which includes first, second, third and fourth light sensitive devices which are arranged in that order on both sides of the predetermined position (relative to a reference point or to the shear) of the leading end or edge of the article or strip. A source of light is provided, and the light and the light sensitive devices are positioned on opposite sides of the strip or its path so that light from the source which reaches the light sensitive devices is determined by the position of the leading edge of the strip. Five signal producing means are provided and are coupled to the light sensitive devices. The first signal producing means produces a first signal in response to no light reaching the light sensitive devices; the second signal producing means produces a second signal in response to light reaching only the first light sensitive device; the third signal producing means produces a third signal in response to light reaching only the first and second light sensitive devices; the fourth signal producing means produces a fourth signal in response to light reaching only the first, second, and third light sensitive devices; and the fifth signal producing means produces a fifth signal in response to light reaching all the light sensitive devices. The first and fifth signals may be used to accumulate variations from the normal position and also to reject the cut lengths of strip. The second and fourth signals may be used to accumulate variations from the normal position. And the third signal may be used to indicate the normal position of the cut lengths of strip. The accumulated variations may be applied to a suitable reversible counter which produces a signal in response to a predetermined net count of the difference between the accumulations of variations in both directions. This counter signal may be utilized to appropriately adjust the position of the leading edge of the strip.

The invention may be better understood from the following description given in connection with the accompanying drawing, and the scope of the invention will be pointed out in the claims. In the drawing:

FIGURE 1 shows a block diagram of one embodiment of the indicating circuit in accordance with the invention as used with a strip processing line;

FIGURE 2 shows a preferred arrangement of the light and light sensitive devices as used in the embodiment of FIGURE 1;

FIGURE 3 shows a schematic diagram of a preferred embodiment of the control circuit utilized in the embodiment of FIGURE 1; and FIGURE 4 shows a schematic diagram of a preferred embodiment of the relay contacts asociated with the relays and control circuit of FIGURE 3.

*General description*

The invention is hereinafter described in connection with a particular embodiment or application, namely a strip processing line in which tinplate or steel strip is cut into predetermined or desired lengths. A side view of such a processing line is shown in the block diagram in FIGURE 1. In such a processing line, a strip 10 of material is fed in the direction indicated from a source (not shown) by means of drive rolls 11 which are driven in the direction indicated to advance the strip 10. The strip 10 advances over supporting and feeding rollers 12 toward a shear 13 which includes two blades that are driven by a shear drive 14. When the blades of the shear 13 are driven together, they cut the strip 10 at their intersection. As shown in FIGURE 1, the strip 10 has just been advanced by the drive rolls 11 to a point at which it is to be cut. When the strip 10 is to be cut, the drive rolls 11 are halted or stopped so that the strip 10 is stationary. The leading or forward end or edge of the strip 10 is positioned at a point between a scanner 16 and a radiant energy source or light 17. The scanner 16 and the light 17 are positioned at the point which is spaced the desired or predetermined distance or length from the shear 13. The scanner 16 is on one side of the strip 10 or its path and the light 17 is on the other side of the strip 10 or its path so that light or radiant energy from the light 17 which reaches the scanner 16 is determined by the actual position or location of the forward edge of the strip 10. The scanner 16 comprises a plurality of radiant energy or light sensitive devices which will be further described. The outputs from these light sensitive devices are applied to a control circuit 20. The control circuit 20 may produce a plurality of signals which, in effect, indicate the position of the leading edge of the strip 10, and hence indicate the length of the strip 10 when it is cut by the shear 13. Two of these signals indicate that the leading edge of the strip 10 is located much too far in either direction from a predetermined normal position, and hence the cut length of the strip 10 is too long or too short; two of these signals indicate that the leading edge of the strip 10 is located some acceptable amount from a predetermined normal position, and hence the cut length of the strip 10 is long or short but acceptable; and one of these signals indicates that the leading edge of the strip 10 is located at the predetermined normal position, and hence the cut length of the strip 10 is correct. The signals which indicate too long or too short a cut length of strip 10 are applied to a gate mechanism 21, this gate mechanism 21 being coupled as indicated by the dashed line to a reject gate 22. On receipt of such a signal, the gate mechanism 21 actuates the reject gate 22 so that the cut length of strip will be rejected or removed. The too long or too short signals and the signals which indicate an acceptable long or short cut length of strip 10 are applied to a counting circuit 23. The counting circuit 23 is preferably a reversible type counter, that is one which may count in either direction. The counting circuit 23 may consist of a reversible stepping switch which is advanced in one direction by long or too long signals and is advanced in the opposite direction by short or too short signals. If a predetermined position in either direction is reached, a net count indication is provided. Thus too long or long signals applied to the counting circuit 23 are counted in one direction, while too short or short signals applied to the counting circuit 23 are counted in the opposite direction. The counting circuit 23 thus provides a net count indicative of the difference between the counts in the two directions. When the net count reaches a predetermined magnitude, a suitable signal may be applied to a feed length control 24 which is coupled mechanically as indicated by the dashed line to the drive rolls 11. The feed length control 24 operates on the drive rolls 11 to correct the distance the strip 10 is advanced for each revolution of the drive rolls 11 so that for each revolution of the drive rolls 11, the strip 10 is advanced the desired distance. Thus if the cut lengths of the strip 10 are too long they will be shortened, and if the cut lengths of the strip 10 are too short they will be lengthened. The arrangement for correcting the drive rolls 11 may take a number of forms, as known in the art. Since this arrangement forms no part of the invention, it will not be described. The counting circuit 23 may be preset by a preset signal so that an output or net count signal is produced at any predetermined net count. A shear operated switch 25 is mechanically coupled to the shear drive 14 as indicated by the dashed line. This shear operated switch 25 is actuated at the same time the shear 13 is actuated, and the switch 25 may be utilized to enable or energize the light 17 and the control circuit 20. Thus a better indication of the cut length of the strip 10 may be obtained.

*Scanner and light*

Figure 2:
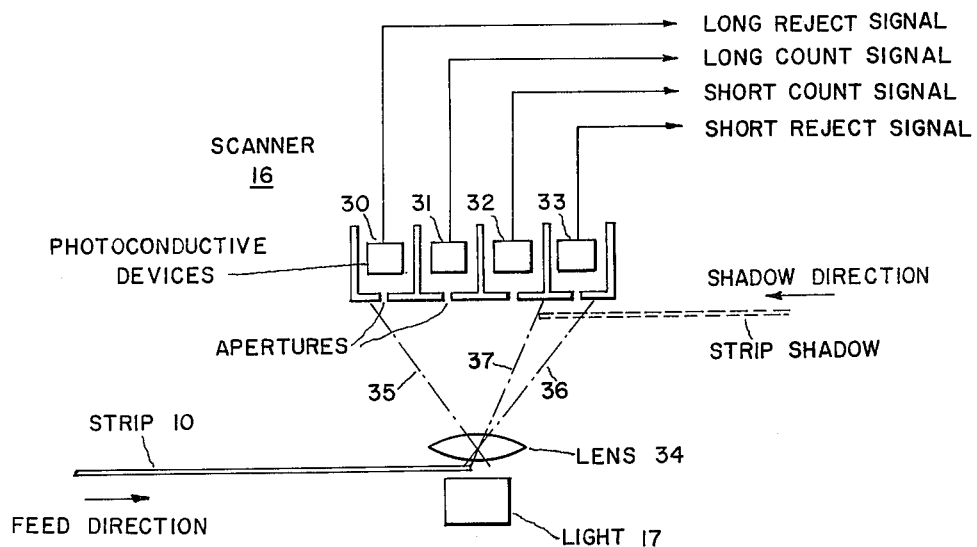

FIGURE 2 shows a side view of an arrangement of the scanner 16 and the light 17 shown in block diagram form in FIGURE 1. The scanner 16 and its components and the light 17 extend the requisite distance along the edge of the strip 10 (i.e., perpendicular to the plane of the drawing). The scanner 16 comprises four suitable radiant energy or light sensitive devices 30, 31, 32, 33, such as photoconductive devices. A photoconductive device, as known in the art, has a circuit impedance or resistance whose magnitude varies inversely with the intensity of light received. Thus, if a greater light intensity is received by such a photoconductive device, its circuit impedance or resistance decreases; if a smaller light intensity is received, its circuit impedance or resistance increases. This variation in impedance with variation in received light intensity is utilized by the control circuit 20 as will be hereinafter explained. Each of the photoconductive devices 30, 31, 32, 33 is suitably and individually enclosed in suitable shielding means and is provided with an individual aperture. The apertures and the photoconductive devices 30, 31, 32, 33 are symmetrically positioned on one side of the strip 10 or its path along a line and on both sides of the leading edge of the strip 10 when it is in its normal or desired position. The light 17 is correspondingly positioned on the opposite side of the strip 10 or its path. Light rays from the light 17 pass through a lens 34 and are focused at the apertures for the photoconductive devices 30, 31, 32, 33. The lens 34 is preferably positioned on the same side of the strip 10 with the photoconductive devices 30, 31, 32, 33. As the strip 10 moves in the direction indicated, it cuts off light rays from the light 17 and produces a strip shadow, indicated by dashed lines, which moves in the direction also indicated. By a suitable adjustment of the distances from the lens 34 to the apertures and to the light 17 in conjunction with the focal length of the lens, magnification of movement of the strip 10 may be attained. This magnification of the movement of the strip 10 and relatively small apertures (for example 0.01 inch wide) provides an extremely sensitive scanner arrangement.

The light 17, the lens 34, and the apertures and photoconductive devices 30, 31, 32, 33 are arranged so that all of the energy from the light 17 passes through the lens 34 within the boundary rays 35, 36 indicated by the dashed and dotted lines. In the absence of the strip 10 between the light 17 and the lens 34, all of the apertures are illuminated. As the strip 10 moves in the direction indicated, the shadow moves across the apertures in the direction indicated also. If the strip 10 is in the position shown, a shadow falls across the aperture associated with the photoconductive device 33 and has the position shown. Light energy from the light 17 is then restricted so that it occupies the space between the boundary ray 35 and the additional ray 37. Thus, only the apertures and the photoconductive devices 30, 31, 32, receive energy from the light 17. It will thus be seen that the apertures which receive light are determined by the position of the leading edge of the strip 10. If the strip 10 is much too short, all apertures and photoconductive devices 30, 31, 32, 33 receive light energy. If the leading edge of the strip 10 takes the position shown which is short, but not too short, the aperture and photoconductive device 33 receive no light, and the other apertures and photoconductive devices 30, 31, 32 do receive light. If the strip 10 is of the proper length, the apertures and photoconductive devices 32, 33 receive no light and the apertures and photoconductive devices 30, 31 do receive light. If the strip 10 is long, but not too long, the apertures and photoconductive devices 31, 32, 33 receive no light and the aperture and photoconductive device 30 do receive light. If the strip 10 is too long, none of the apertures and photoconductive devices 30, 31, 32, 33 receive light. The light 17 is actuated by the shear operated switch 25 so that the scanner 16 actually scans the strip 10 as it is cut, thus providing an accurate indication of the cut length of the strip 10. As already mentioned, the photoconductive devices 30, 31, 32, 33 which do receive light have a relatively low resistance or impedance while those photoconductive devices which do not receive light have a relatively high impedance. These differences in impedance are provided to and utilized by circuits which are coupled to the photoconductive devices 30, 31, 32, 33. The following table illustrates or summarizes the conditions of the photoconductive devices 30, 31, 32, 33 and associated relays 50, 51, 52, 53 (to be described) for various combinations of light and dark conditions:

| Photoconductive Device 30 Relay 50 | Photoconductive Device 31 Relay 51 | Photoconductive Device 32 Relay 52 | Photoconductive Device 33 Relay 53 | Signal Provided |
|---|---|---|---|---|
| Light Deenergized | Light Deenergized | Light Energized | Light Energized | Short Reject; Short Count. |
| Light Deenergized | Light Deenergized | Light Energized | Dark Deenergized | Short Count. |
| Light Deenergized | Light Deenergized | Dark Deenergized | Dark Deenergized | No Error. |
| Light Deenergized | Dark Energized | Dark Deenergized | Dark Deenergized | Long Count. |
| Dark Energized | Dark Energized | Dark Deenergized | Dark Deenergized | Long Reject; Long Count. |

Control circuit

FIGURE 3 shows a schematic diagram of the control circuit 20 shown in block diagram form in FIGURE 1. The control circuit 20 includes a multivibrator circuit, a bias circuit, a long reject circuit, a long count circuit, a short count circuit, and a short reject circuit. The last four of these circuits are respectively associated with the photoconductive devices 30, 31, 32, 33 (shown in FIGURE 2) which are indicated schematically by a resistance and the symbol λ beside it. All of the circuits are supplied with a suitable source of unidirectional potential which is supplied to a potential bus 39 and which is positive with respect to a reference bus 40. The reference bus 40 may be grounded if desired. The long reject circuit is substantially similar to and operates in substantially the same manner as the long count circuit. Likewise, the short reject circuit is substantially similar to and operates in substantially the same manner as the short count circuit. The long reject and long count circuits respectively include a first amplifier transistor 41 of the NPN type and a second amplifier transistor 42 of the PNP type, each of these transistors 41, 42 having an emitter, a base, and a collector. The bases of the first transistors 41 are respectively coupled through resistors 43 to a gate bus 44 and also to one side of the photoconductive devices 30, 31. The other side of the photoconductive devices 30, 31 are coupled to the reference bus 40. The emitters of the first transistors 41 are coupled to a bias level bus 46. The bias level bus 46 is connected to the junction of two bias resistors 47, 48 which are connected in a voltage divider arrangement between the potential bus 39 and the reference bus 40. The potential on the bias level bus 46 is at a level sufficient to normally maintain the first transistors 41 in a nonconducting state. The collectors of the first transistors 41 are respectively coupled through two series resistors to the potential bus 39. The junctions of the two series resistors are coupled to the respective bases of the second transistors 42. The emitters of the second transistors 42 are coupled through diode rectifiers to the potential bus 39 and the collectors of the second transistors 42 are coupled through respective relay windings 50, 51 to the reference bus 40. It will be seen that when the first transistors 41 are conducting, their relay windings 50, 51 are respectively energized.

The multivibrator circuit is used with the long reject circuit and the long count circuit. This multivibrator circuit consists of a monostable or one-shot multivibrator, and includes a normally conducting transistor 55 of the PNP type and a normally nonconducting transistor 56 of the PNP type, each of these transistors 55, 56 having an emitter, a base, and a collector. These transistors 55, 56 are suitably and conventionally coupled together by circuit components including a timing capacitor 57 so that when a positive pulse is applied (by operation of the shear 13 and its switch 25) to the base of the normally conducting transistor 55, it is rendered nonconducting and causes the normally nonconducting transistor 56 to conduct. The duration of conduction of the transistor 56 is determined, among other things, by the value of the timing capacitor 57. When this capacitor 57 is charged, the multivibrator circuit returns to its normal or steady state condition with the transistor 55 conducting and with the transistor 56 nonconducting. During the time that the transistor 56 is conducting however, its collector is at a relatively positive potential. This potential on the collector of the transistor 56 is coupled through a diode rectifier to the gate bus 44 which is connected through respective resistors 43 to the bases of the first transistors 41 of the long reject circuit and the long count circuit respectively. Thus, during the time that the multivibrator circuit is in its transient or switched condition, the gate bus 44 is relatively positive and tends to cause the first transistors 41 to conduct. Whether these first transistors 41 conduct or not is determined by the condition of their respective photoconductive devices 30, 31.

The operation of the long reject circuit will be explained by an example. With reference to FIGURE 2 again, assume that the forward or leading edge of the strip 10 permits energy from the light 17 to reach the photoconductive device 30 and prevents energy from the light 17 from reaching the photoconductive devices 31, 32, 33. (This means the cut length of the strip 10 is long.) When the shear 13 is operated by the shear drive 14, the shear operated switch 25 provides a pulse which switches the multivibrator circuit and provides the relatively positive potential to the gate bus 44. Since, in the assumed example, light is received only by the photoconductive device 30, this photoconductive device 30 in the long reject circuit has a relatively low impedance but the photoconductive device 31 in the long count circuit has a relatively high impedance. The impedance of the photoconductive device 30 is relatively low, in fact sufficiently low with respect to the bias level bus 46 to prevent the positive pulse on the gate bus 44 from causing the first transistor 41 of the long reject circuit to conduct. Since the first transistor 41 of the long reject circuit does not conduct, the second transistor 42 of this long reject circuit also does not conduct and its relay winding 50 remains deenergized. However, the photoconductive device 31 of the long count circuit does not receive light and its impedance or resistance is therefore relatively high. Thus, the positive pulse on the gate bus 44 may cause the first transistor 41 of the long count circuit to conduct. Conduction of this first transistor 41 causes conduction of the second transistor 42 in the long count circuit, and conduction of this second transistor 42 energizes the relay winding 51 in the long count circuit. In summary, it will be seen that in the operation of the long reject circuit and the long count circuit, if light is received by the photoconductive devices 30, 31, their respective relay windings 50, 51 will be deenergized in response to a pulse from the shear switch 25. If no light is received by the photoconductive devices 30, 31, their respective relay windings 50, 51 will be energized in response to a pulse from the shear switch 25. If no light is received by the photoconductive device 30, no light is likewise received by the other photoconductive devices 31, 32, 33. This is the condition for a too long cut length of strip 10.

The short count circuit and the short reject circuit are respectively similar to each other and include first amplifier transistors 59 and second amplifier transistors 60 of the PNP type each having an emitter, a base, and a collector. The bases of the first transistors 59 are respectively coupled through resistors 61 to the potential bus 39 and are respectively coupled through resistors 62 and the photoconductive devices 32, 33 to the reference bus 40. The emitters of the first transistors 59 are coupled to the potential bus 39 and to the bases of the second transistors 60 respectively. The emitters of the second transistors 60 are coupled through a diode rectifier to the potential bus 39 and the collectors of the second transistors 60 are coupled through their respective relay windings 52, 53 to the reference bus 40. The first transistors 59 are arranged so that in the absence of energy on the photoconductive devices 32, 33, these transistors are normally nonconducting. Upon receipt of light by either of these photoconductive devices 32, 33, their resistance or impedance is lowered sufficiently to cause conduction of the first transistor 59, this conduction causing conduction of the second transistor 60. Conduction of the second transistors 60 energizes their respective relay windings 52. 53. This circuit is comparatively straightforward, and may be summarized as providing an energized relay winding in response to light energy falling on its respective photoconductive device. If light is received by the photoconductive device 33, light is likewise received by the other photoconductive devices 30, 31, 32. This is the condition for a too short cut length of strip 10.

*Relay circuit*

Figure 4:
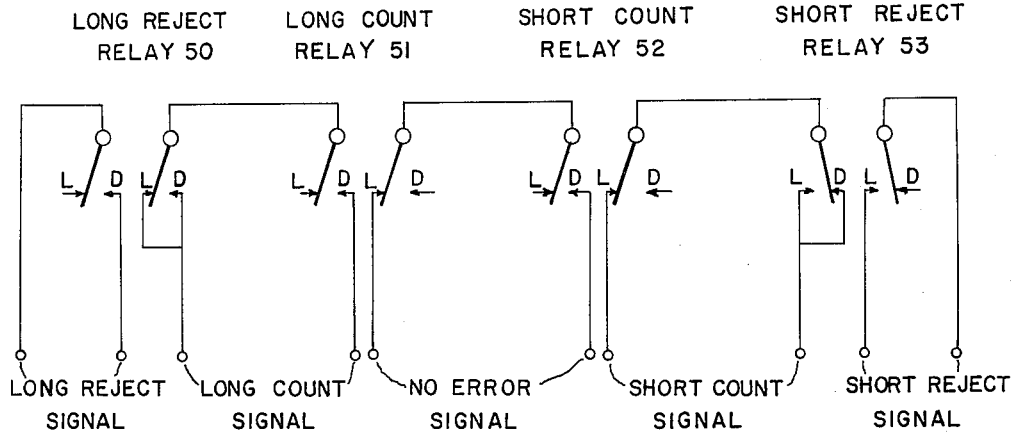

The relay windings 50, 51, 52, 53 of FIGURE 3 have associated contacts for deriving signals in response to the conditions of the various relay windings. These contacts and their connections are shown in the circuit diagram of FIGURE 4, and are in the condition corresponding to the condition shown in FIGURE 2. In FIGURE 4, it will be seen that each relay includes two movable arms each of which engages either of two associated contacts, these contacts being indicated or designated L and D for "light" and "dark" respectively. Thus, if one of the photoconductive devices 30, 31, 32, 33 receives light, the arms of the associated one of the relays 50, 51, 52, 53 engage the L contacts. If one of the photoconductive devices 30, 31, 32, 33 receives no light (i.e., is dark), the arms of the associated one of the relays 50, 51, 52, 53 engage the D contacts. In FIGURE 4, it will be seen that one arm and associated contacts of the long reject relay 50 are utilized to provide a long reject signal which is supplied to the gate mechanism 21; the other arm and associated contacts of the long reject relay 50 are utilized with one of the arms and associated contacts of the long count relay 51 to provide a long count signal which is supplied to the counting circuit 23; the other arm and associated contacts of the long count relay 51 are utilized with one of the arms and associated contacts of the short count relay 52 to provide an optional no error signal; the other arm and associated contacts of the short count relay 52 are utilized with one of the arms and associated contacts of the short reject relay 53 to provide a short count signal which is supplied to the counting circuit 23; and the other arm and its associated contacts of the short reject relay 53 are utilized to provide a short reject signal which is supplied to the gate mechanism 21. With reference to FIGURE 4 and the table previously given above in the specification, the various signals provided by the relay circuit may be ascertained for the varying conditions of the leading edge of the strip 10 with relation to the scanner 16. If a cut length of strip 10 is too long, the long reject and long count relays 50, 51 are both energized to provide a long reject signal and a long count signal. If a cut length of strip 10 is too short, the short reject and short count relays 53, 52 are both energized to provide a short reject signal and a short count signal. If, as shown in FIGURE 2, the cut length of the strip 10 is short, but not too short, a short count signal is provided. As shown in FIGURE 2, the ray 37 illustrates that the photoconductive devices 30, 31, 32 will receive light while the photoconductive device 33 will not receive light. In the table, this is the second condition. When the shear switch 25 provides a signal, the relay 50 of the long reject circuit is deenergized, the relay 51 of the long count circuit is deenergized, the relay 52 of the short count circuit is energized, and the relay 53 of the short reject circuit is deenergized. In the table, it will be seen that a short count signal should be provided for this condition. With reference to FIGURE 4, this signal is provided by a circuit including the interconnected arms and contacts of the short count relay 52 and the short reject relay 53. This circuit may be utilized in any manner desired, such as to provide a signal or pulse to the counting circuit 23 in one direction. As already explained, the counting circuit 23 keeps a net count of the long and short counts. When the net count reaches a predetermined level, a signal is provided for operating the feed length control 24 in one direction or the other direction depending on whether the net count reflected a greater short count or whether the net count reflected a greater long count. The short reject and long reject signals provided are not only counted by the counting circuit 23, but are also utilized by the gate mechanism 21 to operate the reject gate 22.

In conclusion, it will be seen that the indicating circuit of the invention provides, in effect, a digital type of an arrangement which is versatile and which may be modified to meet many operating conditions. For example, the long and short reject signals need not necessarily be counted, but may be utilized solely for rejection. And, the net count in either direction required for operating the feed length control 24 may be set at any predetermined level. For example, a net count of five might be utilized or a net count of 100 might be utilized. Likewise, the concept or arrangement of the invention may be readily modified for use with static devices rather than for use with the relays and stepping switches shown and described. Such modifications, however, will be apparent to persons skilled in the art. Therefore, while the invention has been described with reference to particular embodiments, it is to be understood that modifications may be made without departing from the spirit of the invention or from the scope of the claims.

What I claim as new and desire to secure by Letters Patent of the United States is:

1. A system for indicating variations in the length of an article comprising at least three energy sensitive devices arranged along the length of said article, a source of energy, said source and said devices being positioned relative to said article so that energy from said source which reaches said devices is determined by the length of said article, first means coupled to said devices for producing a first signal in response to the absence of energy from said source reaching said devices, second means coupled to said devices for producing a second signal in response to energy from said source reaching only a first of said devices, said first device being an end one of said devices, third means coupled to said devices for producing a third signal in response to energy from said source reaching only said first device and a second of said devices, said second device being adjacent to said first device, fourth means coupled to said devices for producing a fourth signal in response to energy from said source reaching all of said devices, a counting circuit for counting a signal from said first, second, or fourth means produced as each of a plurality of said articles passes said energy sensitive devices, and a utilization circuit coupled to said counting circuit.

2. A system for indicating variations in the length of an article comprising at least three energy sensitive devices arranged along the length of said article, a source of energy, said source and said devices being positioned relative to said article so that energy from said source which reaches said devices is determined by the length of said article, first means coupled to said devices for producing a first signal in response to energy from said source reaching all of said devices, second means coupled to said devices for producing a second signal in response to energy from said source reaching all but a first of said devices, said first device being an end one of said devices, third means coupled to said devices for producing a third signal in response to energy from said source reaching all but said first device and a second of said devices, said second device being adjacent to said first device, fourth means coupled to said devices for producing a fourth signal in response to the absence of energy from said source reaching said devices, a counting circuit for counting a signal from said first, second, or fourth means produced as each of a plurality of said articles passes said energy sensitive devices, and a utilization circuit coupled to said counting circuit.

3. A system for indicating variations in the length of an article comprising at least four energy sensitive devices arranged along the length of said article, a source of energy, said source of energy and said devices being positioned relative to said article so that energy from said source which reaches said devices is determined by the length of said article, first means coupled to said devices for producing a first signal in response to the absence of energy from said source reaching said devices, second means coupled to said devices for producing a second signal in response to energy from said source reaching only a first of said devices, said first device being an end one of said devices, third means coupled to said devices for producing a third signal in response to energy from said source reaching only said first device and a second of said devices, said second device being adjacent to said first device, fourth means coupled to said devices for producing a fourth signal in response to energy from said source reaching only said first and second devices and a third of said devices, said third device being adjacent said second device, fifth means coupled to said devices for producing a fifth signal in response to energy from said source reaching all of said devices, a counting circuit for counting a signal from said first, second, fourth or fifth means produced as each of a plurality of said articles passes said energy sensitive devices, and a utilization circuit coupled to said counting circuit.

4. A system for indicating variations in the position of the end of an article comprising four radiant energy sensitive devices arranged at different points along a line in the vicinity of said article end, a source of radiant energy, said source of radiant energy and said devices being positioned on opposite sides of said article so that radiant energy from said source which reaches said devices is determined by said position of said article end, first means coupled to said devices for producing a first signal in response to the absence of radiant energy from said source reaching said devices, second means coupled to said devices for producing a second signal in response to radiant energy from said source reaching only a first of said devices, said first device being an end one of said devices, third means coupled to said devices for producing a third signal in response to radiant energy from said source reaching only said first device and a second of said devices, said second device being adjacent to said first device, fourth means coupled to said devices for producing a fourth signal in response to radiant energy from said source reaching only said first and second devices and a third of said devices, said third device being adjacent said second device, fifth means coupled to said devices for producing a fifth signal in response to radiant energy from said source reaching all of said devices, a counting circuit coupled to said means for counting a signal from said first, second, fourth, or fifth means produced as each of a plurality of said articles passes said energy sensitive devices, and a utilization circuit coupled to said counting circuit and responsive to a predetermined count in said counting circuit.

5. A system for indicating variations in the position of an edge of an article from a reference point comprising first, second, third, and fourth radiant energy sensitive devices arranged in that order along a line and on both sides of a predetermined position of said article edge, a source of radiant energy, said source and said devices being positioned on opposite sides of said article so that radiant energy from said source which reaches said devices is determined by said position of said article edge relative to said reference point, first means coupled to said devices for producing a first signal in response to the absence of radiant energy from said source reaching said devices, second means coupled to said devices for producing a second signal in response to radiant energy from said source reaching only said first device, third means coupled to said devices for producing a third signal in response to radiant energy from said source reaching only said first, second, and third devices, fourth means coupled to said devices for producing a fourth signal in response to radiant energy from said source reaching all of said devices, and a utilization circuit coupled to said means and responsive to said first, second, third and or fourth signal produced as each of a plurality of said articles passes said radiant energy sensitive devices.

6. A system for indicating variations in the position of an edge of an article from a reference point comprising first, second, third, and fourth light sensitive devices arranged in that order along a line and on both sides of a predetermined position of said article edge, means for independently shielding each of said light sensitive devices, each of said shielding means having an aperture therein, a source of light, said source of light and said light sensitive devices and apertures being positioned on opposite sides of said article so that light from said source which reaches said apertures and said light sensitive devices is determined by said position of said article edge relative to said reference point, first means coupled to said light sensitive devices for producing a first signal in response to the absence of light from said source reaching said light sensitive devices, second means coupled to said light sensitive devices for producing a second signal in response to light from said source reaching only said first light sensitive device, third means coupled to said light sensitive devices for producing a third signal in response to light from said source reaching only said first, second, and third light sensitive devices, fourth means coupled to said light sensitive devices for producing a fourth signal in response to light from said source reaching all of said light sensitive devices, a counting circuit coupled to said means for respectively counting said first or second signal or for respectively counting said third or fourth signal produced as each of a plurality of said articles passes said energy sensitive devices, and a utilization circuit coupled to said counting circuit, said utilization circuit being responsive to a predetermined count in said counting circuit.

7. A system for indicating variations in the position of an edge of an article from a reference point comprising first, second, third, and fourth light sensitive devices arranged in that order along a line and on both sides of a predetermined position of said article edge, means for independently shielding each of said light sensitive devices, each of said shielding means having an aperture therein, a source of light, said source of light and said light sensitive devices and apertures being positioned on opposite sides of said article so that light from said source which reaches said apertures and said light sensitive devices is determined by said position of said article edge relative to said reference point, first means coupled to said light sensitive devices for producing a first signal in response to the absence of light from said source reaching said light sensitive devices, second means coupled to said light sensitive devices for producing a second signal in response to light from said source reaching only said first light sensitive device, third means coupled to said light sensitive devices for producing a third signal in response to light from said source reaching only said first, second, and third light sensitive devices, fourth means coupled to said light sensitive devices for producing a fourth signal in response to light from said source reaching all of said light sensitive devices, and a utilization circuit coupled to said means and responsive to said first or fourth signal produced as each of a plurality of said articles passes said light sensitive devices.

8. A system for indicating and varying the position of an edge of an article from a reference point at which an operation is preformed on said article comprising first, second, third, and fourth radiant energy sensitive devices arranged in that order along a line and on both sides of a predetermined position of said article edge, a source of radiant energy, said source and said devices being positioned on opposite sides of said article so that energy from said source which reaches said devices is determined by said position of said article edge relative to said reference point, first means coupled to said devices for producing a first signal in response to the absence of energy from said source reaching said devices, second means coupled to said devices for producing a second signal in response to energy from said source reaching only said first device, third means coupled to said devices for producing a third signal in response to energy from said source reaching only said first, second, and third devices, fourth means coupled to said devices for producing a fourth signal in response to energy from said source reaching all of said devices, a counting circuit coupled to said means for making a first count of said first and second signals and for making a second count of said third and fourth signals and providing a net count indicative of the relative magnitudes of said first and second counts, and a utilization circuit coupled to said counting circuit for varying said reference point in response to said net count exceeding a predetermined magnitude.

9. A system for indicating and varying the position of an edge of an article from a reference point at which an operation is performed on said article comprising first, second, third, and fourth radiant energy sensitive devices arranged in that order along a line and on both sides of a predetermined position of said article edge, a source of radiant energy, said source and said devices being positioned on opposite sides of said article so that energy from said source which reaches said devices is determined by said position of said article edge relative to said reference point, first means coupled to said devices for producing a first signal in response to the absence of energy from said source reaching said devices, second means coupled to said devices for producing a second signal in response to energy from said source reaching only said first device, third means coupled to said devices for producing a third signal in response to energy from said source reaching only said first and second devices, fourth means coupled to said devices for producing a fourth signal in response to energy from said source reaching only said first, second, and third devices, fifth means coupled to said devices for producing a fifth signal in response to energy from said source reaching all of said devices, a counting circuit coupled to said means for making a first count of said first and second signals and for making a second count of said fourth and fifth signals and providing a net count indicative of the relative magnitudes of said first and second counts, and a utilization circuit coupled to said counting circuit for varying said reference point in response to said net count exceeding a predetermined magnitude.

10. The system as defined in claim 9 wherein said utilization circuit varies said reference point in one direction in response to said first count exceeding said second count by said predetermined magnitude and varies said reference point in an opposite direction in response to said second count exceeding said first count by said predetermined magnitude.

11. The system as defined in claim 9 and further including an additional utilization circuit coupled to said means and responsive to said first and fifth signals.

References Cited by the Examiner
UNITED STATES PATENTS

| 2,933,185 | 4/1960 | Coleman et al. | 250—209 X |
| 2,941,086 | 6/1960 | Gottschall et al. | 250—219 |
| 3,061,732 | 10/1962 | Milnes | 250—209 X |
| 3,066,226 | 11/1962 | Lindstrom | 250—222 |
| 3,069,013 | 12/1962 | Neubrech et al. | 250—219 |
| 3,076,374 | 2/1963 | De Neergaard | 250—231 X |

References Cited by the Applicant
UNITED STATES PATENTS

| 1,913,153 | 6/1933 | De Salardi. |
| 1,984,051 | 12/1934 | Biggert. |
| 1,998,950 | 4/1935 | Cockrell. |
| 2,003,027 | 5/1935 | Wright. |
| 2,916,633 | 12/1959 | Stone et al. |
| 2,941,086 | 6/1960 | Gottschall et al. |
| 2,962,596 | 11/1960 | Leimer et al. |

RALPH G. NILSON, *Primary Examiner.*